(12) United States Patent
Wise et al.

(10) Patent No.: US 7,463,267 B2
(45) Date of Patent: Dec. 9, 2008

(54) SYSTEM FOR INTERLEAVED STORAGE OF VIDEO DATA

(75) Inventors: Adrian Philip Wise, Bracknell (GB); James A. Darnes, West Ilsley (GB)

(73) Assignee: LSI Corporation, Milpitas, CA (US)

( * ) Notice: Subject to any disclaimer, the term of this patent is extended or adjusted under 35 U.S.C. 154(b) by 5 days.

(21) Appl. No.: 11/588,087

(22) Filed: Oct. 26, 2006

(65) Prior Publication Data
US 2008/0100635 A1     May 1, 2008

(51) Int. Cl.
G09G 5/399 (2006.01)
G09G 5/36 (2006.01)
G06F 13/28 (2006.01)
G06F 12/02 (2006.01)

(52) U.S. Cl. ............ 345/540; 345/533; 345/544; 345/547

(58) Field of Classification Search ......... 345/537, 345/540, 547, 533, 536; 711/5, 127, 157; 365/230.03, 230.04
See application file for complete search history.

(56) References Cited

U.S. PATENT DOCUMENTS

| | | | |
|---|---|---|---|
| 5,581,310 A * | 12/1996 | Vinekar et al. | 348/718 |
| 5,781,200 A | 7/1998 | Lu et al. | 345/516 |
| 5,793,693 A | 8/1998 | Collins et al. | 365/230.01 |
| 5,835,952 A * | 11/1998 | Yamauchi et al. | 711/157 |
| 6,104,416 A * | 8/2000 | McGuinness | 345/544 |
| 6,396,763 B1 | 5/2002 | Orii | 365/230.03 |
| 7,016,418 B2 | 3/2006 | Wang et al. | 375/240.24 |

OTHER PUBLICATIONS

Linzer, Elliot and Leung, Ho-Ming, "Method and/or Apparatus for Video Data Storage", U.S. Appl. No. 10/306,751, filed Nov. 27, 2002.
Linzer, Elliot and Leung, Ho-Ming, "Method and/or Apparatus for Video Data Storage", U.S. Appl. No. 11/590,516, filed Oct. 31, 2006.

* cited by examiner

Primary Examiner—Kee M. Tung
Assistant Examiner—Hau H Nguyen
(74) Attorney, Agent, or Firm—Christopher P. Maiorana, PC

(57) ABSTRACT

A method for reading atoms positioned within a memory having a first memory portion and a second memory portions, comprising the steps of (a) positioning the atoms having memory addresses across the memory, (b) defining a strip across a portion of the atoms, (c) designating a first atom within the strip, (d) locating one or more second atoms to be paired with the first atom, (e) determining whether the one or more second atoms when paired with the first atom forms a legitimate pair, and (f) reading the legitimate pair from the first memory portion and the second memory portion.

20 Claims, 13 Drawing Sheets

4X4 OFF-GRID RECTANGLE STRADDLES A MAXIMUM OF EIGHT ATOMS, REQUIRING A TOTAL OF 128 BYTES BE READ FROM MEMORY

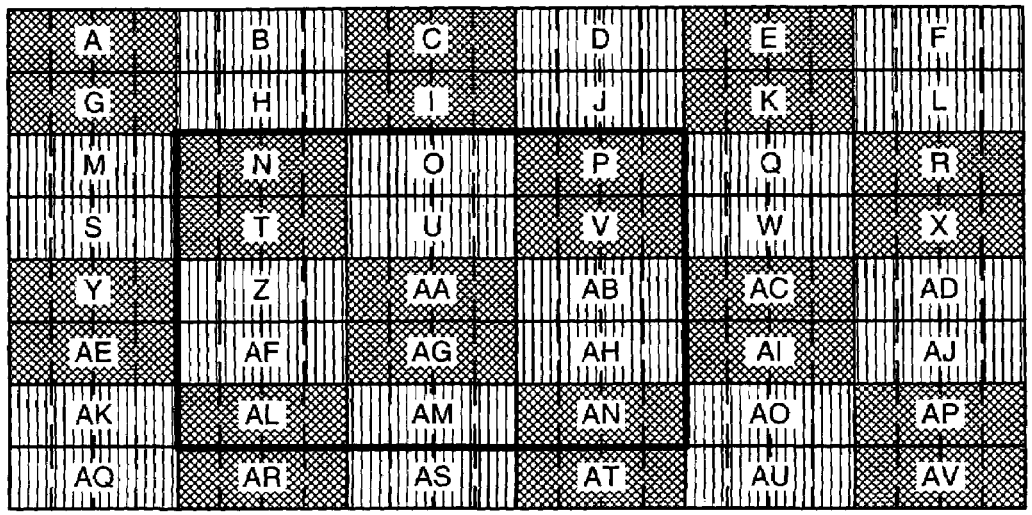
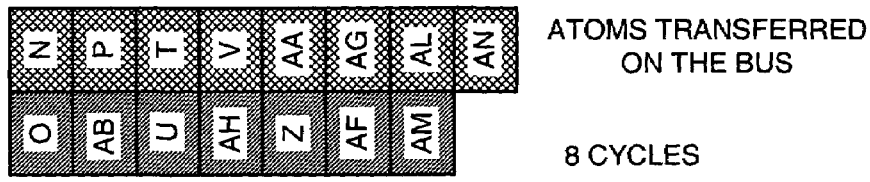 ATOMS TRANSFERRED ON THE BUS
8 CYCLES
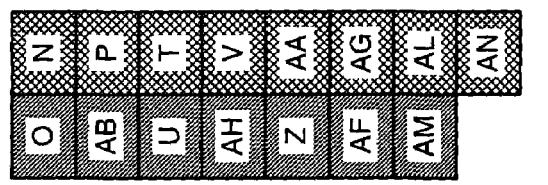 P1
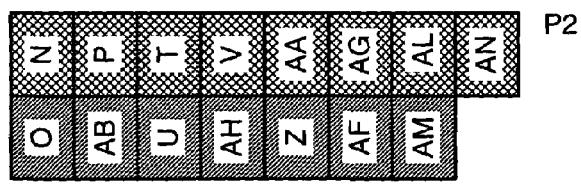 P2
 T0
FIG. 14
T1
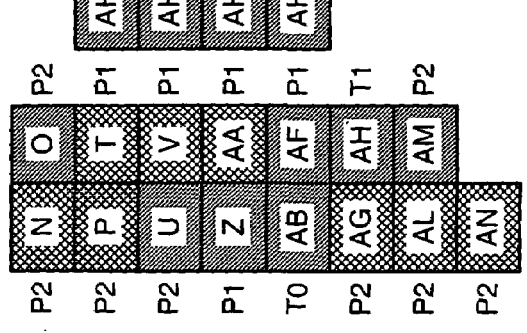 ATOMS AT INPUT TO BARREL SHIFTER

SYSTEM FOR INTERLEAVED STORAGE OF VIDEO DATA

CROSS REFERENCE TO RELATED APPLICATION

The present application may relate to co-pending application Ser. Nos. 10/306,749 and 10/306,751 which are hereby incorporated by reference in their entirety.

FIELD OF THE INVENTION

The present invention relates to data storage generally and, more particularly, to a method and/or apparatus for interleaved storage of video data.

BACKGROUND OF THE INVENTION

In one conventional video storage approach, a 1920 pixel wide by 1080 pixel high image can be stored as 1080 rows of 1920 bytes. Such an approach would have a memory page size of 1024 bytes. Therefore, the 1080 rows of the image would be spread over a number of pages. All of the bytes of the first row are followed by the bytes of each subsequent row when storing the image. When the image is processed (i.e., compressed), 9×9 blocks of the image are operated upon. When loading a 9×9 block stored in the raster format, at least 9, and possibly ten, pages are retrieved.

In one conventional storage approach, an image is divided into a number of 32×32 pixel tiles. Each of the tiles is stored contiguously as one 1024 byte page. Such a conventional approach reduces the number of pages transferred per 9×9 blocks over other conventional methods.

In another conventional storage approach, data within each of the tiles is stored in a raster format. By storing an image as tiles, a 9×9 block (or any size block up to 32×32) (or motion compensation block) can be transferred by retrieving at most 4 pages. In such an approach, an interlaced image has each field stored separately.

It would be desirable to implement a method and/or apparatus for implementing interleaved storage of data that may be adapted to modern memory devices.

SUMMARY OF THE INVENTION

The present invention concerns a method for reading atoms positioned within a memory having a first memory portion and a second memory portion, comprising the steps of (a) positioning the atoms across the memory, (b) defining a strip across a portion of the atoms, (c) designating a first atom within the strip, (d) locating a second atom to be paired with the first atom, (e) determining whether the second atom when paired with the first atom forms a legitimate pair, and (f) reading the legitimate pair from the first memory portion and the second memory portion.

The objects, features and advantages of the present invention include providing a method and/or apparatus for interleaved storage of video data that may (i) allow memory accesses to be more efficient (ii) be easy to implement and/or (iii) simplify on-chip hardware.

BRIEF DESCRIPTION OF THE DRAWINGS

These and other objects, features and advantages of the present invention will be apparent from the following detailed description and the appended claims and drawings in which:

FIG. 14 is a diagram illustrating an example of reading an odd width request.

DETAILED DESCRIPTION OF THE PREFERRED EMBODIMENTS

Figure 1:
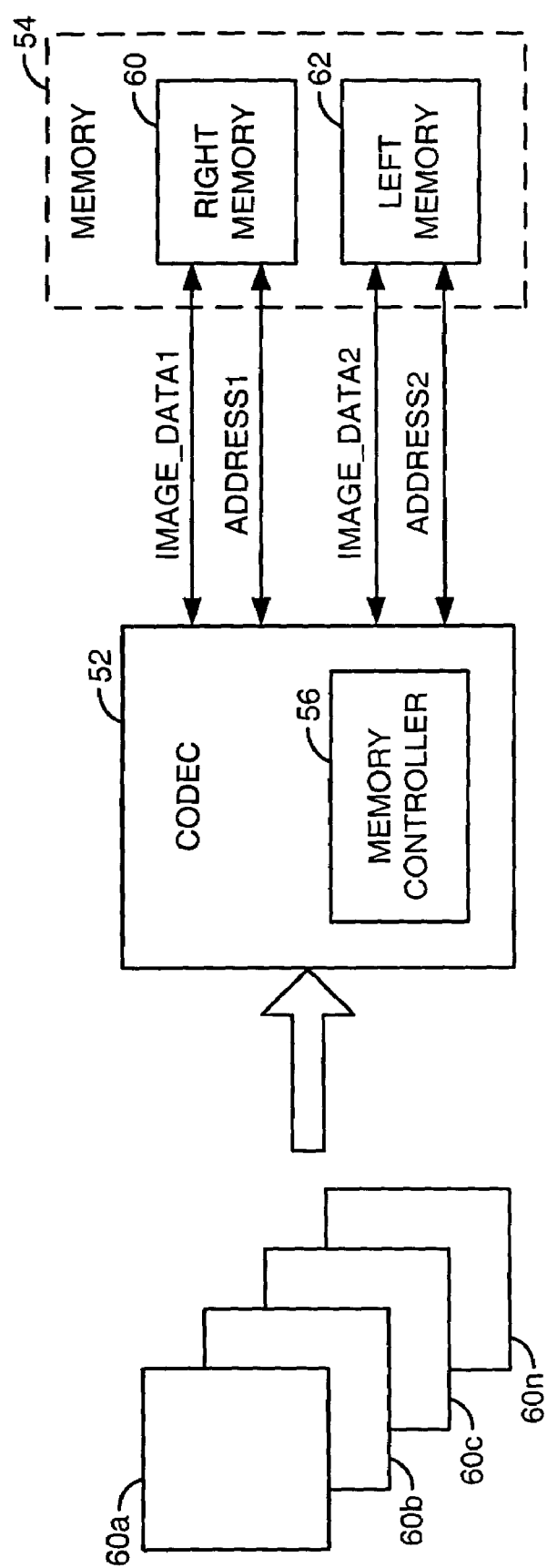
FIG. 1 is a diagram illustrating a context of the present invention.

Referring to FIG. 1, a system 50 is shown illustrating a context of the present invention. The system 50 generally comprises a block (or circuit) 52 and a block (or circuit) 54. The circuit 50 may be implemented as a coder/decoder (CODEC) circuit. The circuit 52 generally comprises a memory controller (or circuit) 56. The CODEC circuit 52 may receive an input signal comprising a series of images 60a-60n. The images 60a-60n are generally in an uncompressed format. In one example, the images 60a-60n may be a series of digital frames. In another example, the images 60a-60n may be an abstraction representing portions of an analog video signal. In either case, the circuit 52 may be used to present and/or receive a signal (e.g., IMAGE_DATA1), a signal (e.g., IMAGE_DATA2), a signal (e.g., ADDRESS1) and a signal (e.g., ADDRESS2). The signal IMAGE_DATA1 and the signal IMAGE_DATA2 may be compressed data signals representing the frames 60a-60n that may be stored in the memory 54. The signal ADDRESS1 and the signal ADDRESS2 may be address signals that are used to access the memory 54. The signal IMAGE_DATA1 and the signal IMAGE_DATA2 may also be referred to as data busses. Similarly, the signal ADDRESS1 and the signal ADDRESS2 may also be referred to as address busses.

The memory 54 generally comprises a block (or circuit) 60 and a block (or circuit) 62. The circuit 60 may be implemented as a "right" memory circuit. The circuit 62 may be implemented as a "left" memory circuit. The term "right" and the term "left" are abstract concepts used to describe different and/or distinct portions within the memory 54. In general, separately manufactured memory chips may be used to implement the memory 60 and the memory 62. In certain implementations, the memory 60 and the memory 62 may be separate portions of a memory (e.g., a dual port memory) that may be accessed from either of two ports. The particular physical location of the memory 60 and the memory 62 may be varied such that the right memory 60 is on one portion of the memory 54 and the left memory 62 is on another portion of the memory 54. In general, the right memory 60 may be configured to present/receive the signal IMAGE_DATA1 and the signal ADDRESS1. Similarly, the left memory 62 may be configured to present/receive the signal IMAGE_DATA2 and the signal ADDRESS2. The memory controller 56 may be used to arbitrate how data is presented/retrieved from the memory 60 and the memory 62. The memory controller 56 may implement a protocol for accessing (or addressing) the memory 60 and the memory 62 that substantially reduces address loading between the memory 60 and the memory 62. By implementing the address signal ADDRESS1 to access one of the memories 60 or 62 and the address signal ADDRESS2 to access the other of the memories 60 and 62, a substantial reduction of address and/or data loading between the memories 60 and 62 may be achieved.

The present invention provides a method and/or apparatus for controlling how the memory 54 is accessed. Video source encoding and decoding involves reading data from the memory 54. The data may be interpreted as representing a small rectangular area of an image. Such small rectangular areas may vary off-grid. For example, while any practical organization in the memory 54 may have a natural alignment on $2^n$ address boundaries, the small rectangular areas needed to be read may be (i) at any integer (e.g., (x,y) coordinate in the image) and (ii) of a size such that the width and/or height of the small rectangle may not be powers of two.

The memory 54 may be implemented in video source coding standards such as H.264. H.264 may demand that such rectangular areas be as small as 4×4 luminance pixels. In contrast, earlier video source coding standards had a minimum size of 8×8 luminance pixels. The demands of H.264 coding may make the problem of efficiently reading the rectangles of data from the memory 50 significantly more important. In one example, the memory 54 may be implemented as a commodity dynamic random access memory (DRAM) device for image storage. The DRAM was originally designed to be more suitable for use in a personal computer (PC). Other memory devices (e.g., non-DRAM devices) may be more suitable to the problem being described, but may also be too costly to implement versus implementing a DRAM for video storage.

In general, a double data rate (DDR) DRAM device does not provide random access to locations in the random access memory (RAM). With a DDR DRAM device, a hierarchy of accesses to the memory 54 are generally needed. In order to read a specific word from the memory 54, a row or page in the DRAM generally needs to be activated. Such activation may cause all of the words in a particular row of the memory 54 to be read into a temporary storage. The temporary storage may have a higher speed within the DRAM device. DDR DRAM devices may typically be organized in four or eight banks. Each bank may have, at most, one row activated at a given time. The banks may operate independently of one-another, with several (or all) of the banks having a single row activated simultaneously. After a short period of time has elapsed after a row has been activated, data may be read or written to and from the temporary high speed storage within the DRAM device. With the DRAM, random access may not be possible since the minimum addressable unit of data may be two (DDR-1) or four (DDR-2) words of information. An atom may be defined as the minimum addressable unit of data. In general, a single transfer command may transfer a burst that is longer than the atom. However, commands may be issued that interrupt the burst so that a two or four word atom may be effectively used. The two or four word atom may be used even if the two or four word atom is shorter than the burst length. Once all operations intended for the activated row are completed, rows that are activated may need to be "precharged" in order to write all of the data from the high speed temporary storage back into the main storage array within the DRAM. Such a precharge operation may also need a period of time to expire before a new row may be activated.

For CODEC memories, a DRAM may be coupled to a 32-bit wide bus (e.g., at least 32-bits) in order to meet the overall bandwidth of the DRAM. For a DDR-2 DRAM, the atom size may be 16 bytes (e.g., 4 words each of four bytes).

Figure 2:
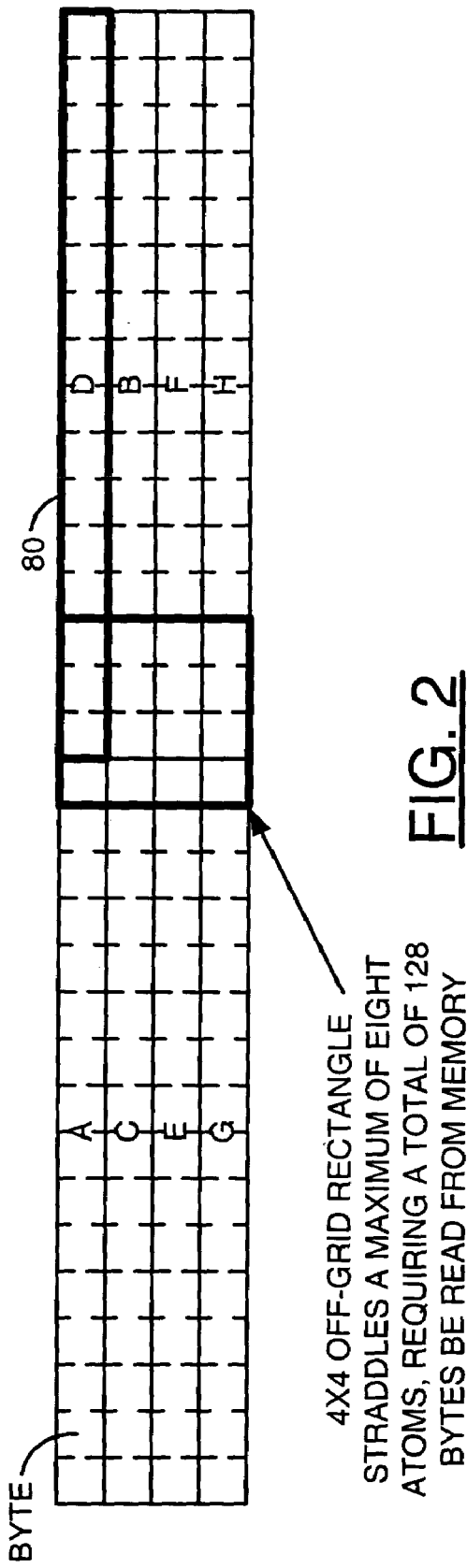
FIG. 2 is a diagram illustrating an atom being read from memory.

Referring to FIG. 2, a diagram illustrating an atom 80 being read from the memory 54 is shown. In general, each square in FIG. 2 represents a byte. A number of atoms A-H are shown. The atom D is shown in bold for clarification purposes. If the atoms are organized to represent a horizontal row of pixels, then in the worst case, a 4×4 read (also shown in bold) from the memory 54 may straddle up to eight atoms A-H as shown. In order to recover the 16 bytes of data actually needed from the memory 54 without the present invention, a read of a total of 128 bytes may be necessary. In such a scenario, 7/8 of the data read from the DRAM may be discarded. In general, the row may have nothing to do with a row of pixels in the (x,y) coordinate space of the image.

Figure 3:
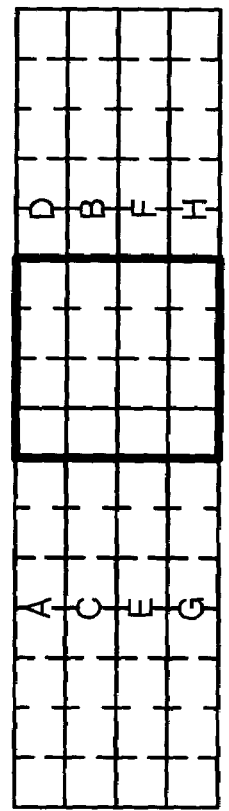
FIG. 3 is another diagram illustrating an atom being read from memory.

Referring to FIG. 3, a diagram illustrating an 8-byte atom being read from a block of the memory 54 is shown. If the 32-bit bus is divided into two 16-bit halves, and data is interleaved between two (independently addressed) 16-bit memory devices, then each 16-bit DRAM has an atom size of 8 bytes. In such a case, the total data that may be read in the worst case may be reduced to 64 bytes.

In order for the scheme as illustrated in FIG. 3 to operate effectively, (e.g. for all rectangular regions to be read from the memory 54) half of the atoms (for all rectangular regions to be read from the memory) are generally read and located in the DRAM attached to a 16-bit half of the data bus (e.g., the memory 60). The other half are generally located in the DRAM and connected to the other 16-bit half of the data bus (e.g., the memory 62).

Consideration of the theoretical worst-case access patterns may motivate the need for such an alternate type of memory organization (e.g., locating and reading half of the atoms in the DRAM attached to one 16-bit half of the data bus). In general, decoding bitstreams may be difficult to support with conventional approaches. In such a case, the access pattern may be needed by the bit-stream currently being decoded which creates the need to deal with a worst case bit-stream. The worst case bit-stream may specify a large number of small off-grid rectangles that are read from the memory 54.

Much of the work identified in the co-pending applications (Ser. Nos. 10/306,749 and 10/306,751) was motivated by the desire to minimize the number of address bits that differ between left and right DRAMs 60 and 62. The present invention also take into account high speeds and electrical problems that may be created (and avoided) if there were a mixture of address lines loaded with a single DRAM (e.g., address lines that differ between the left and right DRAMs) and address lines loaded with two the DRAMs 60 and 62.

The address signals ADDRESS1 and ADDRESS2 for the left and right DRAMs 60 and 62 normally need to each be driven with an independent signal for electrical reasons. The present invention may need to constrain addresses to the left and right DRAMs 60 and 62 so as to have differences in just a small number of address bits. Removing such a restriction may allow for further optimizations. Such optimizations may allow (i) accesses to be more efficient and (ii) for the simplification of the on-chip hardware.

Figure 4:
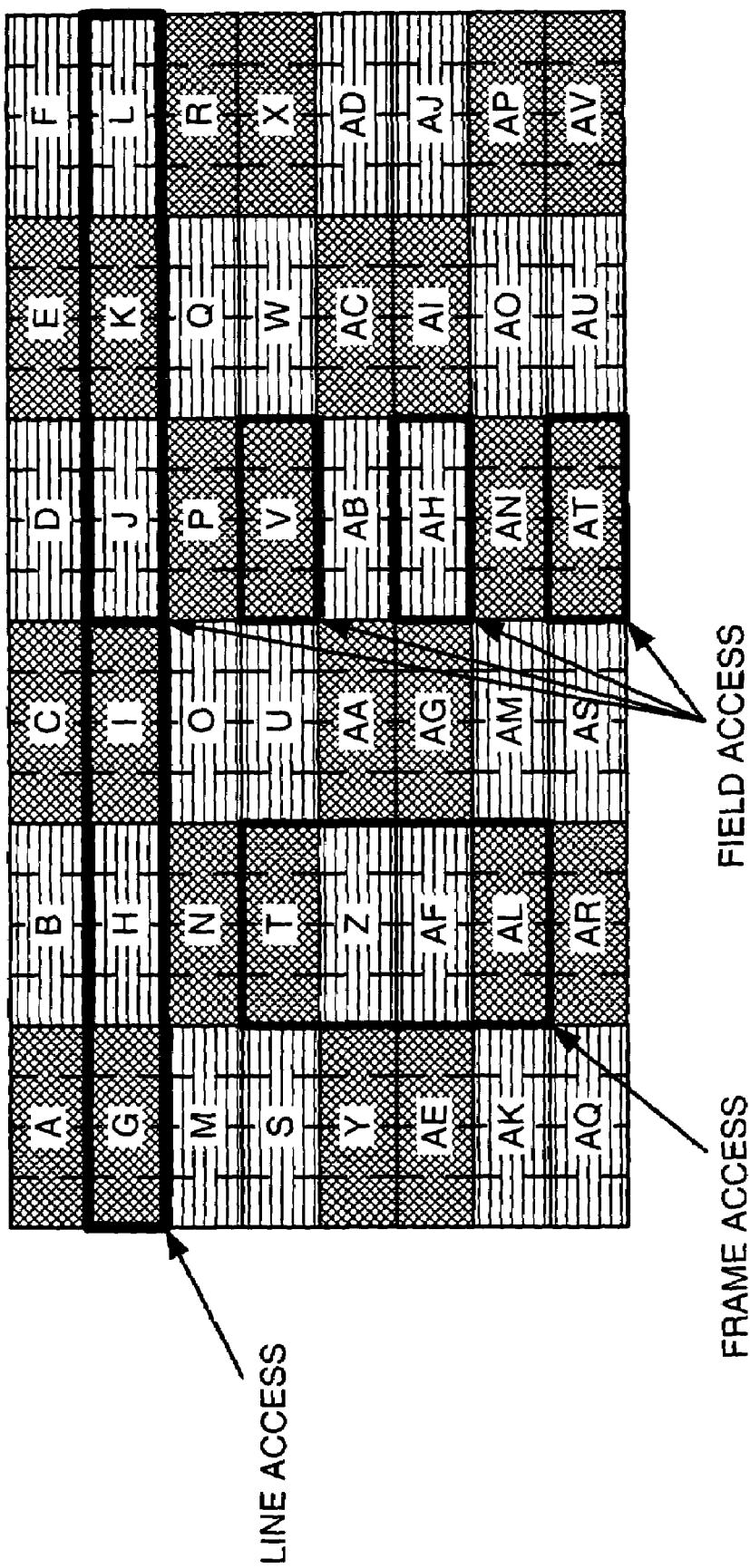
FIG. 4 is a diagram illustrating a frame access, field access and line access.

Referring to FIG. 4, a diagram illustrating a frame access, a field access and a line access is shown. The atoms (e.g., A, C, E, G, etc.) may be stored in one DRAM (e.g., either the memory 60 or the memory 62). The other atoms (e.g., B, D, F, H, etc.) may be stored in another DRAM (e.g., the other of the memory 60 or the memory 62). Data may be organized in a series of tiles in order to minimize overhead. In general, frame, field and line accesses may need to be supported by the particular organization of data in the memory 54. If data is distributed between the two DRAM devices 60 and 62, and each DRAM device 60 and 62 is connected to half of the data bus (e.g., IMAGE_DATA1 and IMAGE_DATA2), then the data may be interleaved in such a way that for all common access patterns, the data may be evenly distributed between the DRAM devices 60 and 62.

Frame and field accesses may be commonly used in video decoding (and encoding) routines in order to access rectangular regions from the memory. While FIG. 4 illustrates 4×4 rectangles, additional sizes of rectangles may be needed. The particular size of the rectangles may be varied to meet the particular video source coding standard implemented. Frame access and field access may be distinguished in the coding of interlaced video material. Interlaced video material may be commonly used in broadcast television and associated recorded media technologies. In such cases, each field may sample data from alternate horizontal lines in the image. The video encoding programs may choose to code data in the frame mode, where data may need to be read from both fields. In the field mode, data may need to be read from alternate lines in the frame that constitute one field.

In one example, line access may be needed in the display process. With the display process, data may be scanned and passed (generally after additional processing steps) to the video monitor or television for viewing. For each of the three identified access patterns (e.g., frame, field and line), half of the data may be stored in one DRAM (e.g. a left portion of the DRAM) and the other half of data may be stored in the other DRAM (e.g a right portion of the DRAM).

Memory image data may be stored in framestores. Framestores may include lines from both fields that are interleaved with one-another on a line-by line basis. The present invention may be particularly useful to allocate separate areas for each field and to perform frame accesses with the memory controller 56. Such an implementation may allow legacy coders/decoders to work with the present invention. However, one preferred framestore structure of the present invention may offer more efficient bandwidth utilization for frame accesses. The data may be stored in a tiled fashion to improve performance. Higher performance may be achieved by minimizing the number of times page boundaries are crossed. Tiled storage may be selected when a strip request is made by a client and a bit (e.g., TileH) of the request is set to one. The bit TileH may be driven from the least significant bit of the DMA address register. A client may provide the DMA address register to specify the image base address (e.g., ImageBaseAddr).

A tile may be used to store a rectangular area of the image. The size of a tile may be one DRAM row in one bank across all of the connected DRAM devices 60 and 62. When a framestore is allocated with tiled storage, all of the tiles in that particular framestore may be located in half of the banks available in the DRAM 54. In the case of 4-bank devices, a given framestore may either use banks 0 and 2, or the framestore may use banks 1 and 3. Such distinction between banks 0 and 2 and banks 1 and 3 may be referred to as even or odd polarity, respectively.

When measured in bytes, the tile may be square (e.g., 32 by 32); or a 2:1 rectangle (e.g., 64 wide by 32 tall in the frame). The exact dimensions may depend on the size of the particular DRAM page implemented. Storage may be effectively allocated in multiples of the tile. Tiles may form a checkerboard pattern when the tiles are arrayed to form a framestore.

Figure 5:
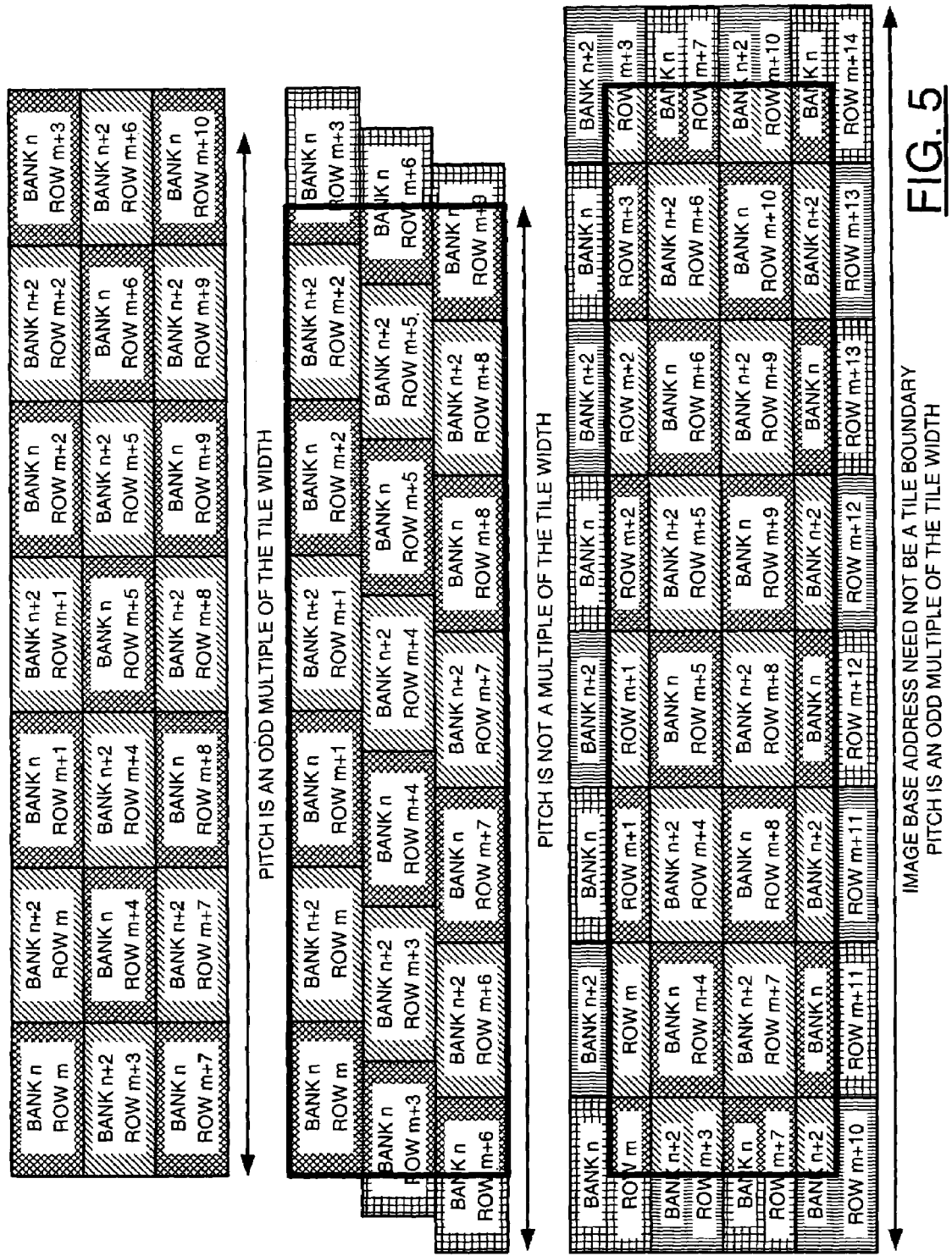
FIG. 5 is a diagram illustrating tiling of framestores in a checkerboard pattern where pitch is an odd multiple of tile width.

Referring to FIG. 5, a diagram illustrating the tiling of framestores is shown. The natural allocation for a 4-bank device may be where the pitch is an odd multiple of the tile width. In such a case, the natural allocation of tiles in a raster-scan order may yield a checkerboard pattern. The checkerboard pattern may ensure that tiles that are horizontally or vertically adjacent to one another and are in different banks to one another. Addressing logic may work even when the pitch is not a multiple of the tile width. However, there may be tighter restrictions than on earlier devices since the pitch is normally a multiple of a macro-atom width. A macro-atom generally comprises the combination of an atom stored in the left memory 60 and an atom stored in the right memory 62. When the pitch is not a multiple of the tile width, performance may be degraded because vertically adjacent tiles may be in the same bank as one-another.

The address ImageBaseAddr may not necessarily point to a particular tile boundary. Instead, the address ImageBaseAddr may refer to a top-left portion of the macro-atom. The address ImageBaseAddr may be a base address for a particular framestore. The checkerboard pattern may be maintained if the pitch is a multiple of the tile width even if the address ImageBaseAddr is not aligned to a tile boundary.

Figure 6:
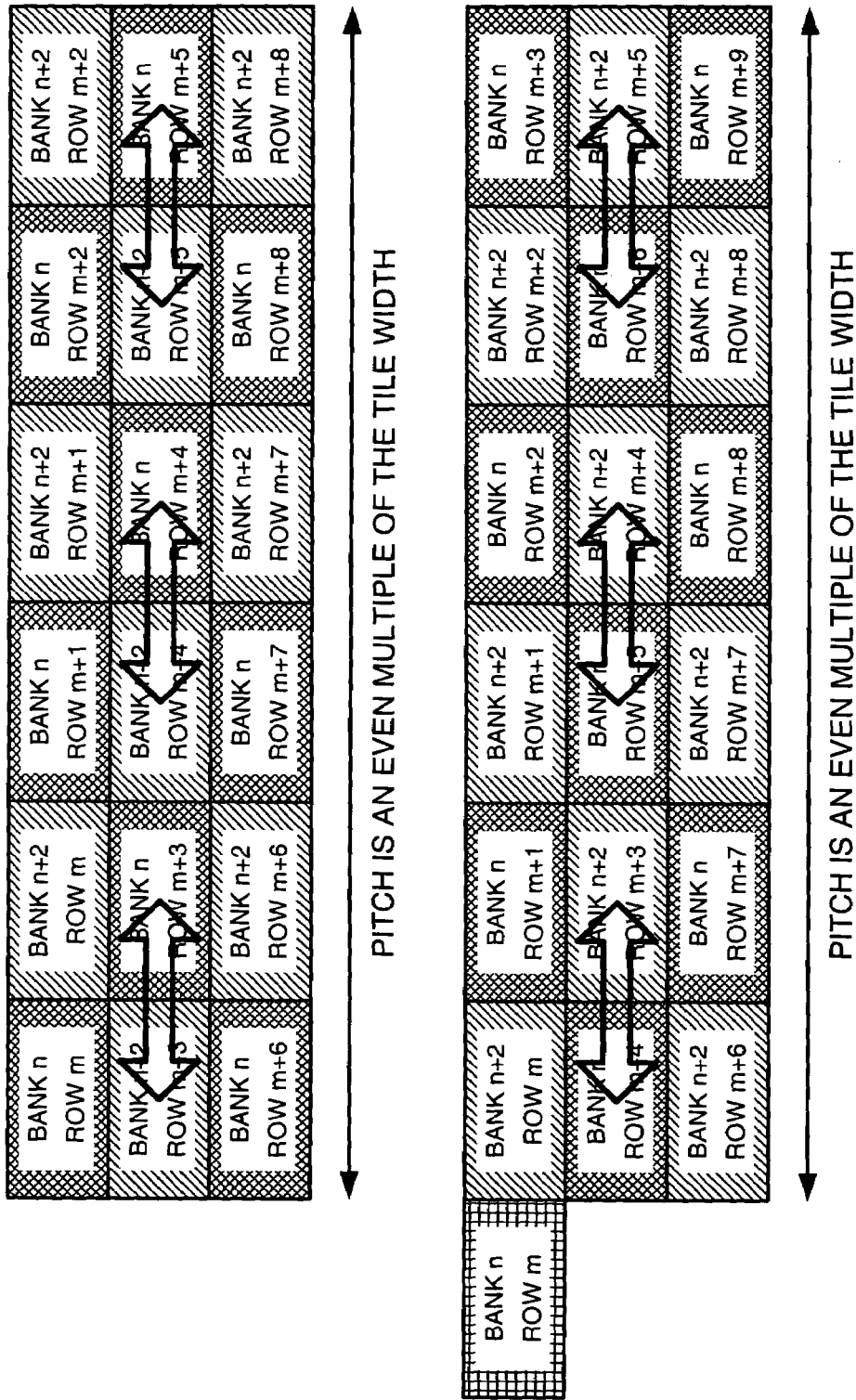
FIG. 6 is a diagram illustrating tiling of framestores in a checkerboard pattern where pitch is an even multiple of tile width.

Referring to FIG. 6, a diagram illustrating the tiling of framestores when the pitch is an even multiple of the tile width is shown. In one example, when the pitch is an even multiple of the tile width and the address ImageBaseAddr is such that the framestore starts at the left hand side of a tile (but not necessarily the top of the tile), the tiles in odd rows of tiles may be swapped. The checkerboard pattern may be maintained by starting the framestore at the left hand side of the tile. Maintaining the pitch at an even multiple of the tile width may be important for image size (e.g., 1920). Even when the pitch is an even multiple of the tile width.

For CODEC memories, such swapping may work in the case that the address ImageBaseAddr points at an upper bank (e.g., bank marked "Bank n+2" in FIG. 6). The use of pointing the address ImageBaseAddr at an upper bank was not implemented on devices not implementing the present invention.

Figure 7:
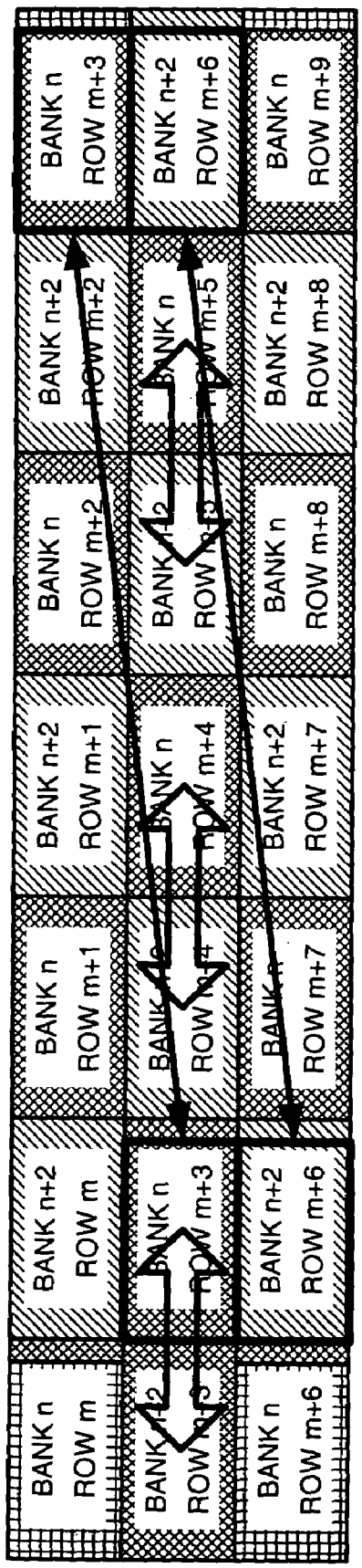
FIG. 7 is a diagram illustrating address aliasing.

Referring to FIG. 7, a diagram illustrating an example of address aliasing is shown. The swapping scheme may not work if the address ImageBaseAddr is not aligned horizontally with the start of a tile. In general, no swapping is needed if the address ImageBaseAddr is not aligned horizontally and the checkerboard may not be present. The non-alignment of the address ImageBaseAddr may lead to a lower performance in forming predictions.

Figure 8:
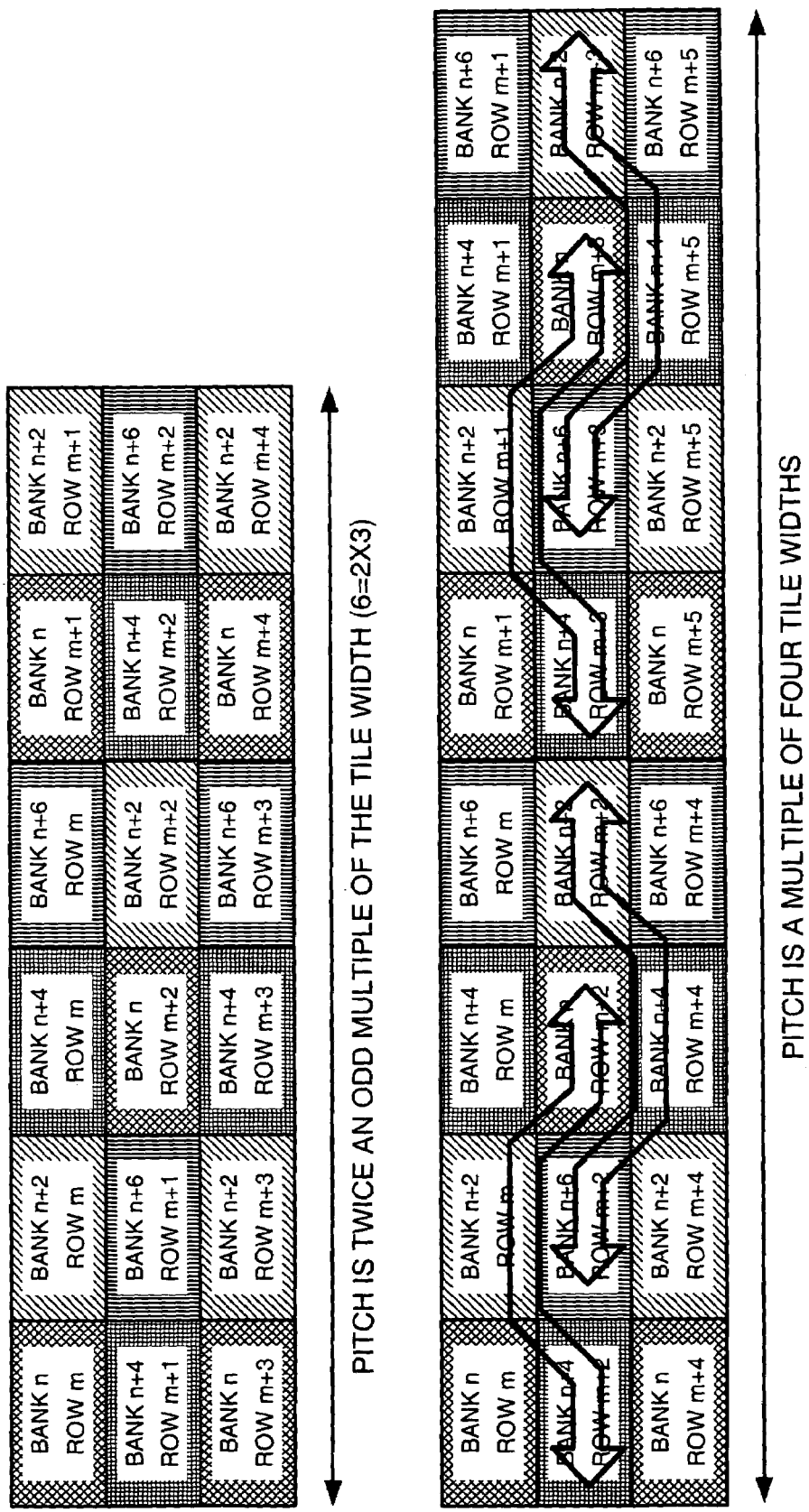
FIG. 8 is a diagram illustrating tiling of framestores.

Referring to FIG. 8, a diagram illustrating tiling of framestores is shown. For 8-bank memories, the pitch may be programmed similarly to 4-bank devices. Slightly higher performance may be obtained by making the pitch twice an odd multiple of the tile width. As such, all predictions, even the predictions that straddle the corner where four tiles meet, may never touch two tiles in the same bank as one another. In such a case, the rule about when to swap tiles in odd rows may be modified. For 8-bank devices, non-adjacent pairs of tiles may swapped in odd tile rows if the pitch is a multiple of four tile widths.

Figure 9:
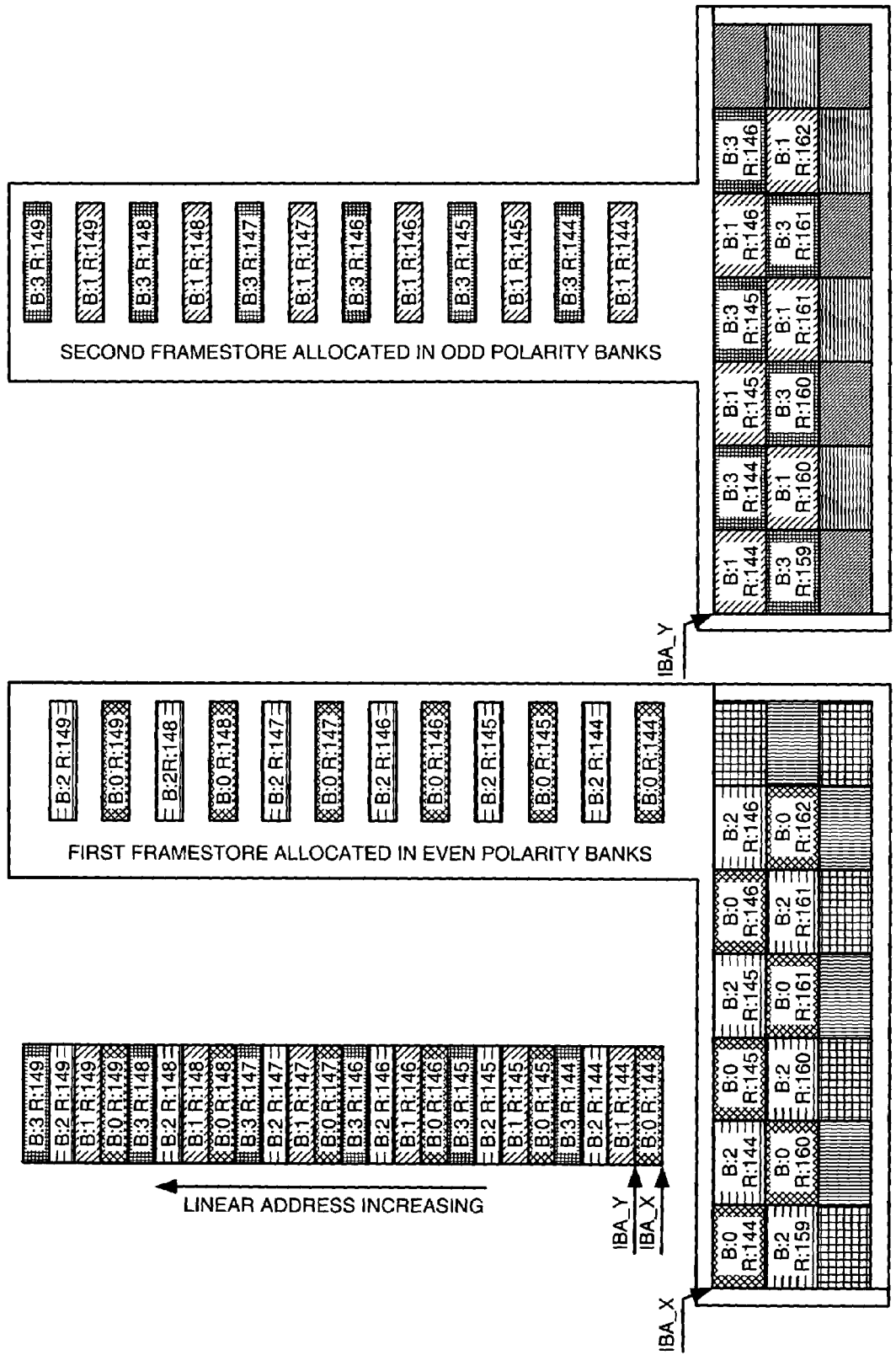
FIG. 9 is a diagram illustrating an allocation of interleaved 1920-wide framestores.

Referring to FIG. 9, a diagram illustrating an allocation of interleaved 1920-wide framestores is shown. In the case of a 4-bank device, a given framestore may use either the bank0 and the bank2 or use the bank1 and the bank3. The distinction may be referred to as "even" and "odd" pluralities, respectively. The selection of the particular polarity may be controlled by a bank polarity bit stored within the address ImageBaseAddr. A bank polarity bit may remain unaltered for all locations in a framestore. For example, the bank polarity bit may be set to bit 11. The same value represented in the first tile of an image (defined by the address ImageBaseAddr and in the bank polarity bit) may be the same value placed in the remainder of the image. Given an address ImageBaseAddr with a bank polarity bit, the next higher order bit may be used to define which tile within the image is being addressed.

Such a designation of the polarity bits may mean that when a framestore is allocated, the framestore may use half of the memory addresses within a particular span of addresses. A second framestore may be allocated which uses the same address ImageBaseAddr. The second framestore may include the polarity bit that is inverted. The second framestore may use the other half of the memory addresses interleaved with the first framestore.

Figure 10:
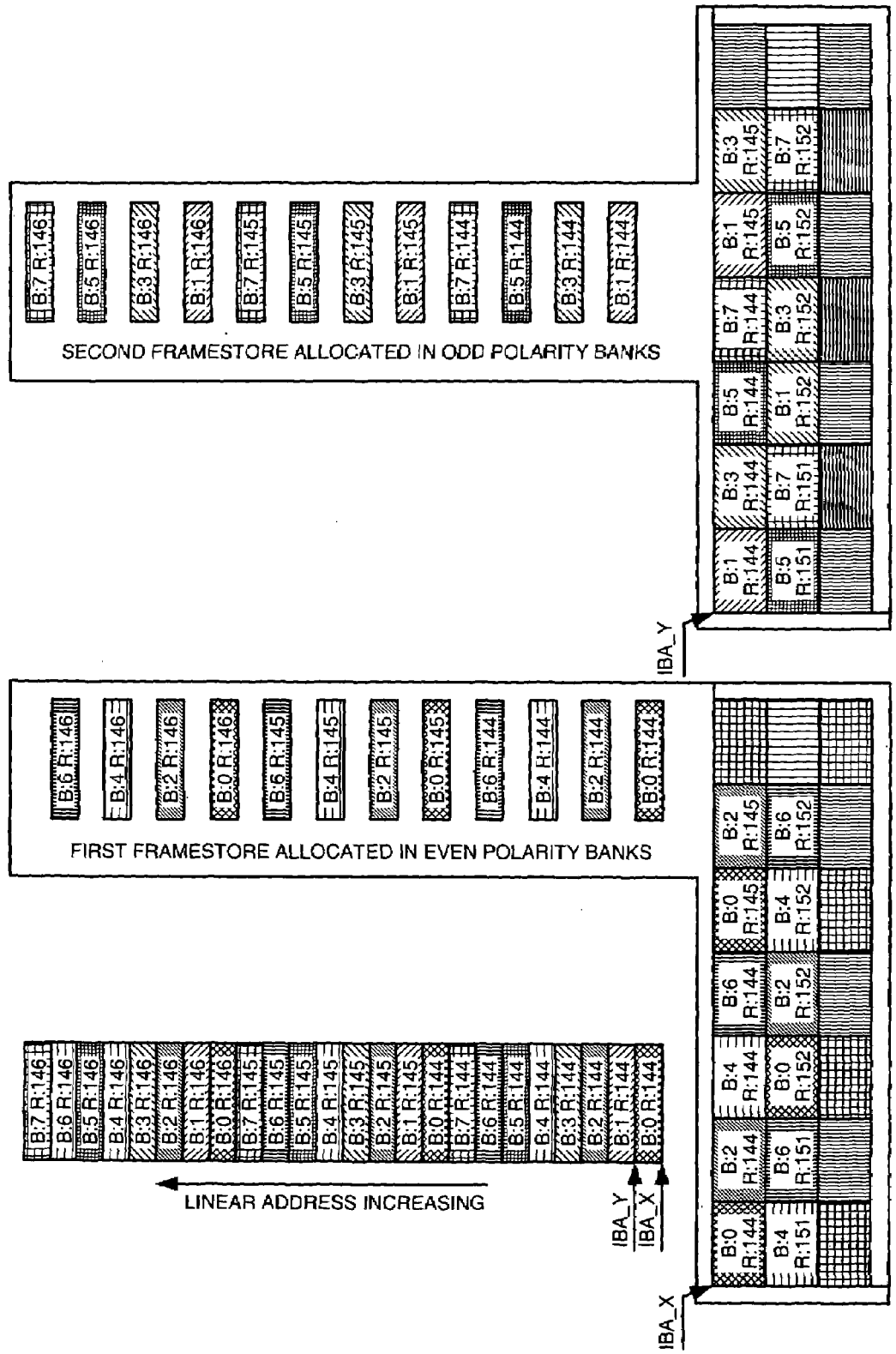
FIG. 10 is a diagram illustrating an 8-bank allocation of interleaved 1920-wide framestores.

Referring to FIG. 10, a diagram illustrating an 8-bank allocation of interleaved 1920-wide framestore is shown. The pitch may be set twice as an odd multiple of the tile width. For 8-bank devices, the allocation may be done similarity to 4-bank devices. In general, there may be no major changes to the addressing logic in order to achieve an 8-bank allocation where the pitch may be set to twice an odd multiple of the tile width. The logic that may be dependent on the number of banks may be similar to the logic used to swap tiles where the pitch is even or a multiple of four. The difference may be a value programmed into the pitch register (e.g., RowWidth).

Software (or firmware executed) on the memory controller 56 may choose to use pitch values that may yield a higher performance when driving 8-bank memories. Such software may use a 4-bank allocation and achieve the same performance as would have been obtained with a 4-bank memory device. The polarity bit may be the least significant bank bit (e.g., bit BA0).

For CODEC memories, the size of a DRAM row (e.g., one row in one bank and across all of the connected DRAM packages) may be 1K, 2K, 4K, etc. However the particular size of the DRAM row may be varied to meet the design criteria of a particular implementation.

FIG. 10 also illustrates an 8-bank allocation of interleaved 1920-wide framestores. The width and height of the Tile may be given in the following Table 1:

TABLE 1

| Total RAM row size | Width of Tile | | Height of Tile | |
|---|---|---|---|---|
| | Bytes | Bits to addr. | Bytes | Bits to addr. |
| 1K byte | 32 | 5 | 32 | 5 |
| 2K byte | 64 | 6 | 32 | 5 |
| 4K byte | 64 | 6 | 64 | 6 |

In general, each of the memory organizations that are supported generally includes support for an atom, where an atom may be considered the smallest addressable unit of memory.

The dual memory approach supported on CODEC memories in accordance with the present invention may maximize the bandwidth when reading small off-grid rectangles. The dual memory approach may maximize the bandwidth when reading small of-grid rectangles by allowing half of an atom size which would "naturally" occur if the same data bus width were used with a single address. To be efficient, both halves of the data bus may be used in parallel. Such a condition may be true when reading (i) frame organized predictions; (ii) field organized predictions (which may need data from every-other scanline); and (iii) line organized data. In order to achieve efficiency, data may be distributed between the left and right DRAMs 60 and 62 in a repeating pattern to define the macro-atom.

Figure 11:
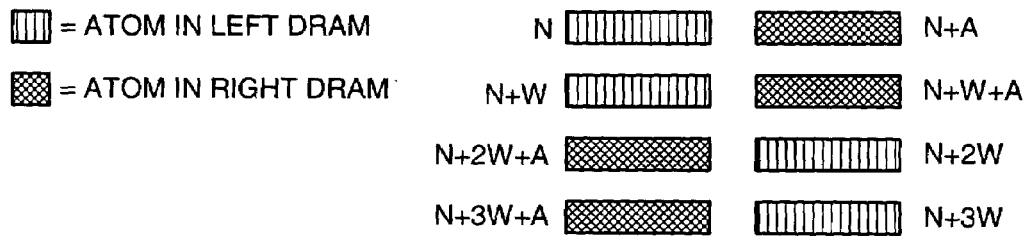
FIG. 11 is a diagram illustrating atoms positioned in corresponding left and right DRAMs.

Referring to FIG. 11, a diagram illustrating atoms positioned in corresponding left and right DRAMs is shown. FIG. 11 illustrates the linear address of each of the atoms, where "a" is the size of the atom in bytes; "w" is the width of the tile, "bytes n" is a multiple of 2a and "floor n/w" is a multiple of four.

When addressing the macro-atom from a device that uses linear addressing (such as a processor), atoms in the lower two rows of atoms (within the macro-atom) may be addressed in the opposite order to atoms positioned in the upper two rows.

To simplify addressing, the macro-atom may be aligned with the same grid that defines the tiles. For strip accesses, when TileH=1, the address ImageBaseAddr may need to refer to the address of the top left atom in a macro-atom. In this manner, the macro-atom may also be aligned to the grid that defines blocks, macroblocks and fields/frames in accordance to predefined image coding standards.

Bytes may be transferred on the buses IMAGE_DATA1 and IMAGE_DATA2 in raster-scan order. A raster scan order may be defined as (i) rows being scanned from left to right, and (ii) rows being transferred from top to bottom. By transferring bytes on the data buses IMAGE_DATA1 and IMAGE_DATA2 in a raster-scan order, the atoms needed to service a request may be read from memory in raster scan order. When such a transfer is not possible, atoms needed to service the request may not need to be read from the memory 54 in a raster scan order. The exceptions to the raster scan order may provide to be the principal area of the present invention.

The present invention may apply when reading data from the memory 54. In certain situations, the present invention may not be needed when writing data to the memory 54 since the high performance expected for off-grid accesses may not be an issue if the video coder/decoder used for CODEC memories does need to perform off-grid accesses. To satisfy the defined protocol for the data bus IMAGE_DATA1 and IMAGE_DATA2 for off-grid writes of arbitrarily sized rectangles, the atoms may be simply visited in a raster scan order. The use of only a single DRAM (e.g., left or right) in such situations may not present any issues.

Figure 12:
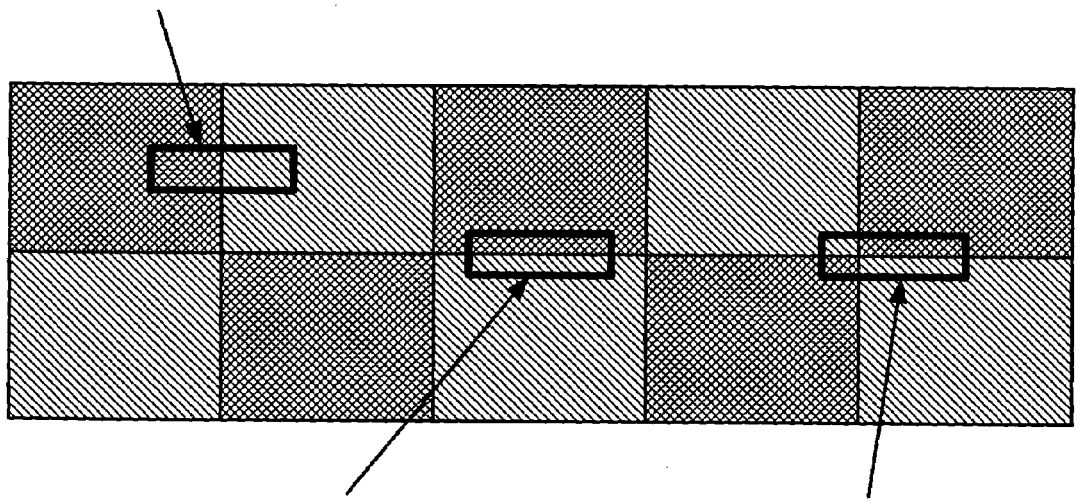
FIG. 12 is a diagram illustrating straddling page boundaries.

Referring to FIG. 12, a diagram illustrating straddling page boundaries is shown. When a request is made, a number of tiles may be straddled. A straddle may refer to the case of when (i) an address is issued to the left DRAM 60 and an (ii) address is issued to the right DRAM 62 in a single clock cycle. A strip request may be made. The strip request (or strip) may be a line access and may straddle a number of tiles. The strip request may only be a single scan-line tall. In one example, the strip may be a prediction read that may touch up to four adjacent tiles. The prediction read may cause complications with efficient handling when reading data from memory. The present invention may be able to use both the left and the right DRAMs 60 and 62 in parallel in as many clock cycles as possible in order to obviate such complications.

In general, bank addresses issued to the left and the right DRAMs 60 and 62 may be independently selected. Such a selection may be used when a READ (or WRITE) command is issued to allow the left DRAM 62 to address one tile, and the right DRAM 60 to address another adjacent tile. Since the bank polarity bit may be constant for all locations in a given framestore, the least significant bit of the bank address may be shared by the left and right DRAMs 60 and 62.

Ignoring, for the moment, issues in the vertical dimension, the selection between left and right DRAMs 60 and 62 may mean that the strip may be treated as a single rectangle. The strip may be an even or an odd number of atoms wide. If the strip is an even number wide, then within each scan line, the left and right DRAMs 60 and 62 each may read half of the atoms for the strip from memory. If the strip is an odd number of atoms wide, a "spare" atom may be present at the right hand of each line, the spare atom may be used for either the left or the right DRAM 60 or 62.

In the case of 4-bank DRAM, a framestore may use only two banks. The banks may be arranged in a checkerboard (if high performance is to be achieved) so that vertically adjacent tiles may differ in bank addresses. For the present invention a set of rules may be implemented to ensure the method as described in connection with FIG. 13 does not (i) make poor decisions while pairing accesses and (ii) pay multiple page over heads. Such rules may include the following:

(i) if a strip does not straddle a vertical tile boundary (e.g., between two horizontally adjacent tiles), then the left and right DRAM addresses may straddle the horizontal tile boundary;

(ii) if the strip straddles a vertical tile boundary, then the left and right DRAM addresses may not straddle a horizontal tile boundary. The addresses may not straddle a horizontal tile boundary since four banks may be simultaneously precharged;

(iii) if the requested strip crosses exactly one tile boundary, (e.g., whether the tile boundary is horizontal or vertical), then (a) both of the tiles may be opened at once and (b) accesses may straddle the boundary; and (iv) if the strip straddles a corner where four tiles meet, then priority may be given to the tile boundary having the horizontally adjacent tiles (the horizontally adjacent tiles that are open at the same time as one another). The lower tiles may be visited, when the last access in the upper pair of tiles has been made.

In the case of 8-bank DRAM, if the pitch and ImageBaseAddr are such that a proper checkerboard is present, then left and right DRAM addresses may straddle both horizontal and vertical tile boundaries. Such a straddling of both the horizontal and vertical boundaries may take place because each of the four tiles that the strip straddles is in a separate bank.

In the case of a line access that straddles several tiles in width, (e.g., when the line access may only be a single line tall), multiple page penalties may occur. The page penalties may be paid with no loss of performance. Since the tiles towards the left of the access may not revisited (because the request is only a single line tall), further efficient access patterns may not be possible.

A large rectangular strip may touch multiple tiles (e.g., more than four) and be more than one line tall. With the large rectangular strip, the access routines defined in accordance with present invention may be considered suboptimal since tiles may be opened and closed multiple times. However, such a problem may be avoided since the opening and closing of tiles multiple times may never occur for any of the video programs of interest. The memory controller 56 may be needed to operate correctly with such a request (e.g., in the sense that the correct data is read from or written to the correct locations).

Figure 13:
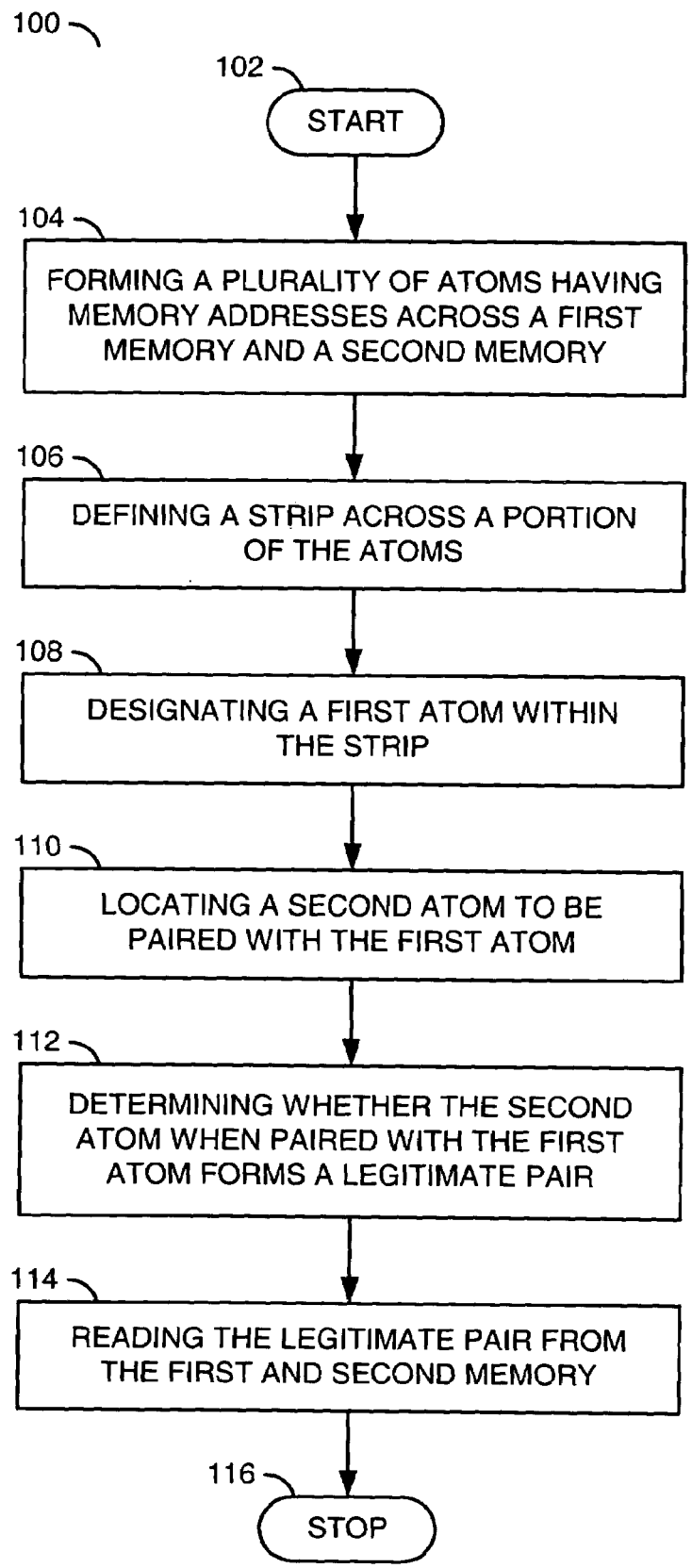
FIG. 13 is a diagram of a method for pairing DRAM accesses in accordance to the present invention

Referring to FIG. 13, a method 100 for pairing DRAM accesses in accordance with the present invention is shown. The method 100 generally comprises a state (or step) 102, a state (or step) 104, a state (or step) 106, a state (or step) 108, a state (or step) 110, a state (or step) 110, a state (or step) 112, a state (or step) 114 and a state (or step) 116. The state 104 may form a plurality of atoms having memory addresses across a first memory portion (or the left DRAM) and a second memory portion (or the right DRAM). The state 106 may define a strip (or strip request) across a portion of the atoms. The state 108 may designate a first atom within the strip.

In general, for each clock cycle, two DRAM addresses may be generated. The first DRAM address may be always generated as the next atom to be visited in a raster scan order that has not already been visited. At the start of the strip, the first DRAM address (or the first atom) may be defined as the address of the atom in the top-left portion of the strip. For each clock cycle, the first DRAM address may be either in the left DRAM 62 or the right DRAM 60. The designation of the first atom as being located in the left DRAM 62 or the right DRAM 60 within the strip may be varied to meet the design criteria of a particular implementation.

The state 110 may locate a second atom to be paired with the first atom. For a given first DRAM address a second DRAM address (or second atom) may need to be located. The second DRAM address may be issued into the opposite DRAM of the first atom in a clock cycle.

The state 110 may use the following pair list to locate which second atom(s) may be paired with the first atom:

(i) the atom immediately to the right of the first atom may be the second atom;

(ii) the atom immediately below the first atom in the requested strip may be the second atom. In the case of a field access, the second atom located may be the atom vertically two scan lines below the first atom in the frame; and (iii) in the case of a frame access, the second atom, may be located vertically two scan lines below the first atom in the requested strip. In general, for field accesses, only options (i) and (ii) in the list may be considered.

The listing of possible pairs in the pair list may be based in priority order. If more than one second atom is located, and the multiple second atoms each form a legitimate pair with the first atom, then the second atom located closest to the top of the pair list may be selected.

The state 112 may determine whether the second atom when paired with the first atom forms a legitimate pair. A legitimate pair of atoms may be simultaneously read from the right memory 60 and the left memory 62. Such a legitimate pair may have a particular spatial relationship between the first and the second atom within the image. Each of the pairs formed via the conditions set forth in the pair list may be tested to determine whether the second atom forms a legitimate pair with the first atom. In order to form a legitimate pair, the second atom may:

(i) be positioned in the opposite DRAM (e.g., left or right) to the first atom;

(ii) not cross a horizontal tile boundary if the strip straddles a vertical tile boundary;

(iii) have the same row address as the first atom if the row addresses between the first atom and the second atom are the same; and (iv) not have been read from the DRAM.

In general, for a frame access, the atom may be read in one line because the atom may be located vertically below two atoms. In a subsequent line, the same atom may be located below an atom that has been read. However, the same atom should not be read again. Instead, the atom located two lines below the current line may be selected and designated as the second atom which forms a legitimate pair with the first atom.

Odd atoms may be read at the right side of the strip. In general, a pipeline stage, a first register, and second register may be used to read atoms out of raster scan order.

Referring to FIG. 14, is a diagram illustrating an example of reading an odd number of atoms in accordance with the method of 100 is shown. A plurality of atoms (e.g., A-AV) may be formed or positioned across the memory. The atoms A-AV may be stored in the left DRAM or the right DRAM. The strip may be formed around a portion of the atoms A-AV. At the start of each strip, a barrel shifter may receive atoms from a pipeline stage (e.g., P1) and a pipeline stage (e.g., P2). After an outstanding odd atom has been read, the pipeline stage P2 may supply atoms to a left side of the bus. After two outstanding odd atoms have been opportunistically read, a pipeline stage (e.g., P1) may supply atoms to both the left side of the bus and the right side of the bus. A temporary register (e.g., T1) and a temporary register (e.g., T2) may temporality store atoms. Each time an atom is supplied from the temporary register T1 and the temporary register T2, the count of outstanding odd atoms may be decremented.

In a first clock cycle, atom N is read from the left DRAM and atom O is read from the right DRAM.

In a second clock cycle, atom P may read, however, atom Q which may be naturally read at the same time as atom P is not needed. Since atom Q is not needed, the atom vertically below atom P may be selected (e.g., atom V). However, atom V may not be read in the same cycle as atom P because atom V is stored in the same DRAM as atom P, so atom AB may be read. Since atom AB has been read out of order, atom AB may be stored in the temporary register T0.

In a third clock cycle, atoms T and U may be read.

In a fourth clock cycle, atom V may be read. Atom W, which normally forms a natural pair with atom V may not be needed. Atom AB may be read at the same time as atom V since atom AB is stored in the opposite DRAM to atom V. However, AB has already been read in the second clock cycle, since atom AB has already been read, atom AH may be read. Since atom AH has been read out of order, atom AH may be stored in the temporary register T0. Since the temporary register T0 is already occupied, Atom AH may be stored in the temporary register TI.

In a fifth clock cycle, atoms Z and AA may be read. At this point, all of the atoms in the scanline (e.g., atoms Z, AA and AB) have been read. As noted in connection with the fourth clock cycle, atom AB has already been read and stored in the temporary register T0.

In a sixth clock cycle, atoms AF and AG may be read. At this point, all of the atoms in the scanline (e.g., atoms AF, AG and AM) have been read. As noted in connection with the fourth clock cycle, atom AH has already been read and stored in the temporary register T1.

In a seventh clock cycle the access pattern may start over again. Atoms AL and AM may be read.

In an eighth clock cycle, atom AN may be read. In general, an access may need for an even or odd number of atoms to be read from memory. The odd or even number of atoms may be based on the number of atoms enclosed within the strip. Since 15 atoms may be needed to be read from memory, there may be nothing paired with atom AN.

With CODEC memories, no attempt needs to be made to pair the last atom (e.g., Atom AN) of one transfer to the first atom of a next transfer. While such an attempt may be possible, the complexity of the control circuitry may be increased significantly for a very marginal increase in performance.

As the atoms in the strip are read from memory, the atoms may be presented to an input of the barrel shifter. The atoms may be transferred to the barrel shifter in a raster scan order. For example, in the cycle in which atom AF is transferred, atom AB may be transferred in the same cycle. Atom AB may be recovered from the temporary register TO in order to regain a correct place in the transfer. Similarly, atom AM may also be transferred in a correct place in the transfer after atom AG is transferred. Prior to AM being transferred, atom AH may be received from the temporary storage T1.

Figure 15:
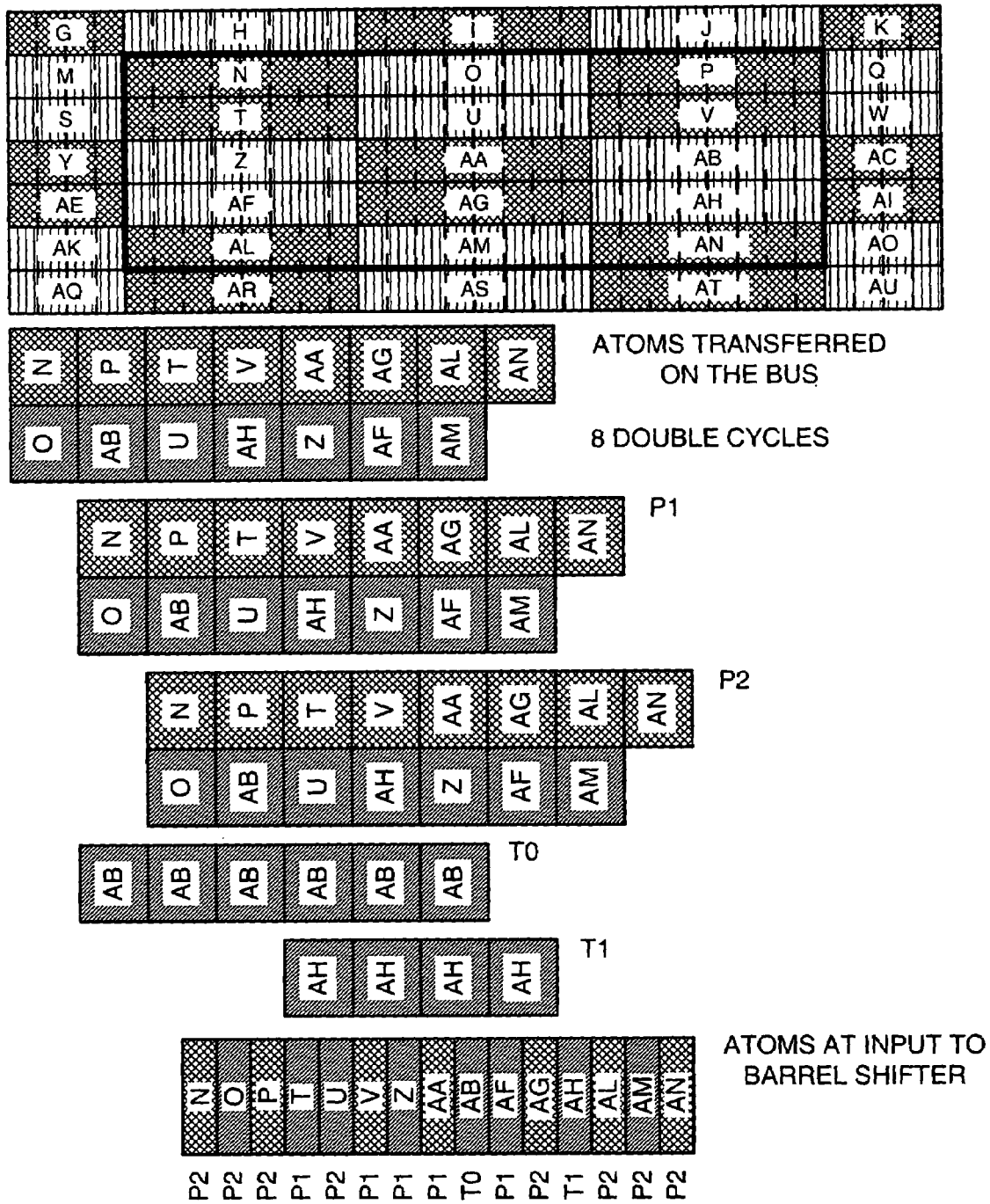
FIG. 15 is another diagram illustrating an example of reading an odd width request.

Referring to FIG. 15, a diagram illustrating another example of reading an odd (number of atoms) width request for an 8-byte atom is shown. For CODEC memories in accordance with the present invention, 8-byte atoms may occur with the DDR-2 DRAM. The DDR-2 DRAM may transfer 8 bytes of the atom as four words. Each word may include two bytes. The first two bytes may be transferred in one clock cycle, the last two bytes may be transferred in a second clock cycle.

The pipeline stage P1 and the pipeline stage P2 may each hold 8-byte atoms. The temporary register T1 and the temporary register T2 may each hold 8-byte atoms. The temporary register T1 and the temporary register T2 may only be clocked every other clock cycle. The values entered into the barrel shifter may come directly from the left DRAM or the right DRAM (e.g., never a mixture of both). In general, as noted in connection with FIG. 13, when there are no outstanding odd atoms, data may be taken from the pipeline stage P2. When there is one outstanding odd atom, data may be alternatively taken from the pipeline stage P1 and the pipeline stage P2.

The present invention may allow for bank and column addresses to be supplied to the left DRAM and the right DRAM independently of one-another.

By supplying bank and column addresses to an independently left and right DRAM, restrictions placed on the alignment of regions that may be read from memory in both the horizontal and vertical dimensions may be simplified.

The present invention may start on either an even or an odd atom and pair the atom immediately to the right of that atom for a horizontal dimension. Such a configuration may simply proceed left to right along the scan line in order to read successive pairs. At the right-hand side of the requested strip, there may be an extra atom that cannot be paired with a neighboring atom located immediately to the right. Such a situation may occur if the number of atoms to be visited in each row is an odd number.

With the address restrictions as disclosed in corresponding co-pending applications (Ser. Nos. 10/306,749 and 10/306, 751), an even-numbered atom may only be paired with the atom that is located immediately to the right of the atom since the atoms share the same address as one another in each respective DRAM. If a strip starts on an odd-numbered atom, then the odd atom may not be naturally paired. An atom vertically below the odd-numbered may need to be read. If the strip is of a width that visits an even number of atoms, but the strip is aligned so as to start on an odd-numbered atom the reading of data may be applied both at the left edge of the strip and the right edge of the strip. Such a reading may need four temporary registers to be available (two for each of the left and right edges of the strip). The extra pipeline stage needed for such a read may need an additional latency paid by each and every read from the memory.

Similarly in the vertical dimension, the present invention may alleviate address restrictions. Such restrictions may include that an opportunistic read may only be made within a macro-atom. If the strip request is aligned such that a first row is not aligned with the macro-atom grid, then some of the opportunistic reads may be available with the present invention.

The present invention may also provide the bank addresses that are independent to the left and right DRAMs. Such a configuration may allow simultaneous accesses to the left and right DRAMs to straddle the tile boundaries. Tile boundaries may be ignored due to such straddling except that the horizontal tile boundary when a four-bank checkerboard is normally used for two DRAM banks for the framestore. The cases where the tile boundaries play a role in determining access time are limited and leads to access time statistics that may be consistently close to the minimum that could possibly be achieved.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A method for reading atoms positioned within a memory having a first memory portion and a second memory portion, comprising the steps of:
    (A) positioning said atoms across said memory;
    (B) defining a strip across a portion of said atoms, wherein said strip comprises a rectangular arrangement of said atoms stored in said first and second memory by (i) alternating each atom between said first and second memory in a horizontal direction and (ii) alternating every two of said atoms between said first and second memory in a vertical direction;
    (C) designating a first atom within said strip;
    (D) locating a second atom to be paired with said first atom;
    (E) determining whether said second atom when paired with said first atom forms a legitimate pair, wherein said legitimate pair occurs when (i) said first atom is positioned in said first memory portion and said second atom is positioned in said second memory portion and (ii) said first and second atom are read during a common clock cycle;
    (F) reading said legitimate pair from said first memory portion and said second memory portion on said common clock cycle; and
    (G) repeating steps (C)-(F) until all of said atoms of said strip are read.

2. The method according to claim 1, wherein step (a) further comprises the step of:
    positioning said atoms into said first memory portion and said second memory portion.

3. The method according to claim 1, wherein said first memory portion comprises a first dynamic random access memory and said second memory portion comprises a second dynamic random access memory.

4. The method according to claim 1, wherein step (c) further comprises the step of: designating said first atom as the top left atom positioned within said strip.

5. The method according to claim 1, wherein step (d) further comprises the step of:
    designating an atom immediately to the right of said first atom to be said second atom.

6. The method according to claim 5, further comprising the step of:
    designating an atom immediately below said first atom to be said second atom.

7. The method according to claim 6, further comprising the step of:
    designating an atom two scan lines vertically below said first atom in said strip to be said second atom for a frame access.

8. The method according to claim 6, further comprising the step of:
    designating an atom two scan lines vertically below said first atom in said strip to be said second atom for a field access.

9. The method according to claim 1, wherein
    said first memory portion comprises a left dynamic random access memory and said second memory portion comprises a right dynamic access memory.

10. The method according to claim 1, wherein step (e) further comprises the step of:
    determining that said second atom forms said legitimate pair with said first atom when the pair formed between said first atom and said second atom does not cross a horizontal tile boundary.

11. The method according to claim 1, wherein step (e) further comprises the step of:
    determining that said second atom forms said legitimate pair with said first atom when said first atom and said second atom have not been read from said memory.

12. The method according to claim 1, further comprising the step of:
    supplying bank and column addresses to said first memory portion and said second memory portion.

13. The method according to claim 1, wherein step (B) further comprises the step of:
    defining said strip across an even or odd number of said atoms.

14. The method according to claim 1, wherein said atom comprises a minimum addressable unit of data.

15. The method according to claim 1, wherein step (F) further comprises the step of:
    reading said legitimate pair from said first memory and said second memory in a raster scan order.

16. The method according to claim 3, further comprising the step of:
    supplying bank and column addresses to said first dynamic random access memory and said second dynamic random access memory, wherein said first dynamic random access memory is addressed independently from said second dynamic access memory.

17. The method according to claim 1, wherein step (F) further comprises the step of:
    transferring one or more legitimate pairs into a barrel shifter.

18. The method according to claim 17, further comprising the step of:
    transferring said one or more legitimate pairs into said barrel shifter in a raster scan order.

19. The method according to claim 1, wherein step (D) further comprises the step of:
    storing said second atom in a temporary register when said second atom is read out of order prior to performing step (E).

20. An apparatus comprising:
    means for positioning atoms across a memory having a first memory portion and a second memory portion;
    means for defining a strip across a portion of said atoms, wherein said strip comprises a rectangular arrangement of said atoms stored in said first and second memory by (i) alternating each atom between said first and second memory in a horizontal direction and (ii) alternating every two of said atoms between said first and second memory in a vertical direction;

means for designating a first atom within said strip;

means for locating a second atom to be paired with said first atom;

means for determining whether said second atom when paired with said first atom forms a legitimate pair, wherein said legitimate pair occurs when (i) said first atom is positioned in said first memory portion and said second atom is positioned in said second memory portion and (ii) said first and second atom are read during a common clock cycle;

means for reading said legitimate pair from said first memory portion and said second memory portion; and means for repeating steps (C)-(F) until all of said atoms of said strip are read.

* * * * *